United States Patent Office

2,903,466
Patented Sept. 8, 1959

2,903,466

PREPARATION OF ACYL TAURIDES

Cheves T. Walling, Upper Montclair, Leo F. McKenney, Upper Saddle River, and Robert Geitz, Westwood, N.J., assignors to Lever Brothers Company, New York, N.Y., a corporation of Maine No Drawing. Application November 5, 1954
Serial No. 467,237

4 Claims. (Cl. 260—401)

The present invention relates to a process for the preparation of alkali metal acyl taurides and, more particularly, relates to a continuous process for the preparation of alkali metal acyl taurides of improved purity.

Acyl taurides having the formula $$R-\overset{O}{\underset{}{C}}-\underset{R'}{N}-CH_2CH_2SO_3M \quad \text{(I)}$$

wherein R is a hydrocarbon radical of 10 to 24 carbon atoms, e.g., lauryl, oleyl, palmityl and stearyl, and R' is hydrogen or an alkyl radical of 1 to 4 carbon atoms, e.g., methyl, ethyl or isobutyl, and M is an alkali metal such as sodium or potassium, find widespread use in synthetic detergent compositions.

Heretofore, compounds of the above formula have customarily been prepared by the reaction of acyl chlorides with the sodium salt of the corresponding taurine by a batch process in aqueous solution. The procedure is described in U.S. Patent No. 1,932,180 and the operation of a commercial process has been described by Kastens and Ayo, Industrial and Engineering Chemistry, volume 42 (1950), page 1626.

According to the typical batch process as practiced in the prior art, an acyl chloride of the formula $$R-\overset{O}{\underset{}{C}}-Cl \quad \text{(II)}$$

wherein R is as defined above, is reacted with an alkali metal salt of the corresponding taurine having the formula

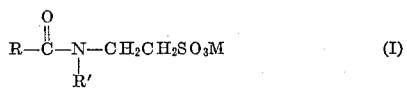

wherein R' and M are as defined above, in an aqueous solution in the presence of excess alkali metal hydroxide to neutralize the hydrochloric acid liberated. The overall equation involved in such a reaction is as follows:

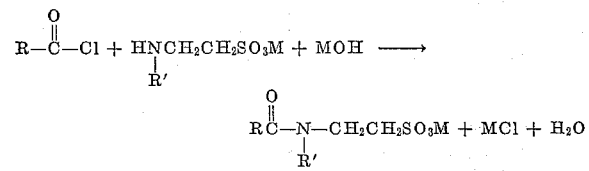

This reaction as practiced batchwise has a number of drawbacks in technical operations. In general, such drawbacks arise because the main reaction, the formation of the acyl tauride, is always accompanied by some hydrolysis of acyl chloride to the corresponding fatty acid and by the formation of soap, e.g.

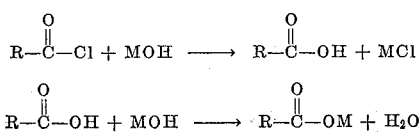

These side reactions are of serious consequence because they not only lead to a waste of acyl chloride, but, also and more important, because the presence of free fatty matter is detrimental to the surface active properties of the major product. For example, the presence of an appreciable quantity of free fatty matter, i.e., above about 5%, leads to a decrease in foaming ability and a decrease in the ability to wash dishes of detergent formulations containing the acyl taurides.

Because of the above side reactions, a batch process must be carried out with careful temperature control and extremely rapid stirring and mixing in order to disperse the acyl chloride satisfactorily. Although this is not particularly difficult in laboratory procedure, it becomes increasingly difficult in large scale operation and despite great precaution in large scale operation it is found that the acyl tauride normally contains from 5 to 12% by weight of free fatty matter in the form of soap or free acid. As a result, the commercial acyl taurides sold on the market almost invariably contain an excess of 5% free fatty matter.

The primary object of the present invention is to provide a process for preparing alkali metal acyl taurides more efficiently and quickly than before and, in particular, to produce products containing relatively small quantities of free fatty matter, in general under 5%, either as free acid or as soaps.

According to the present invention there is provided a continuous process which comprises continuously intermingling with violent agitation a first reactant stream comprising an acyl chloride of Formula II and a second reactant stream comprising an aqueous solution of an alkali metal tauride of Formula III and an alkali metal hydroxide, and continuously withdrawing a reaction product comprising an alkali metal acyl tauride of Formula I.

The process can be performed satisfactorily in a variety of types of mixing apparatus designed for continuous and violent mixing. Votators and homogenizers are suitable apparatus.

The principal variables in the process are the temperature and pH of the product and the molar ratio of sodium hydroxide to tauride in the second reactant stream.

The pH of the product is a direct measure of the ratio of the two reactant streams and accurate control of this ratio can be achieved by control of the pH of the product. In general we have found that the pH of the product for satisfactory operation can be within the range of about 7 to 10 without an appreciable effect on the degree of reaction or on the amount of fatty acids, either free or in the form of soap, in the product.

The temperature of the product is approximately the temperature of the reaction and should be within the range from room temperature to 212° F. but it is preferred to operate at temperatures in the higher part of this range since in this manner there is obtained a higher yield of acyl tauride and smaller quantities of by-product fatty matter in the product. Although the exact optimum temperature range depends upon the particular combination of tauride and fatty acid chloride (the relatively short chain acyl chlorides usually requiring lower temperatures than the longer chain acyl chlorides) optimum results in most cases are achieved when the product temperature is from about 140 to about 190° F. This is higher than the temperatures employed in the conventional batch process.

The reaction is exothermic and the heat of exotherm may be utilized to elevate the temperature to that desired. In some cases it may be desirable to employ a cooling medium in the walls of the reaction vessel to prevent the temperature from rising excessively.

In the majority of cases, the reaction proceeds to completion in from about 1 to 30 seconds from the time of initial contact between the reactant streams.

One of the most important variables is the molar ratio of alkali metal hydroxide to alkali metal tauride in the second reactant stream. The ratio should be at least 1:1 and may be as high as 1.4:1. We have found surprisingly that improved results are obtained when the molar ratio of sodium hydroxide to alkali metal tauride is at least 1.1:1. Insofar as is known the prior art batch processes have utilized molar ratios of these two ingredients of only 1:1 or less.

In order to illustrate the invention more fully, the following examples are presented in which parts and percentages are by weight. Actual mixing time in the examples varied from 1 to 30 seconds.

*Example 1*

Two streams, one consisting of a mixture of 80% palmitic and 20% oleic acid chlorides, and the other comprising a solution of the following composition:

|  | Parts |
|---|---|
| Sodium methyl tauride solution (30% active) | 5370 |
| Sodium hydroxide solution (50%) | 930 |
| Sodium chloride | 880 |
| Water | 6575 |
| Total | 13755 | were metered into the "A" unit of a Girdler "minivotator" in approximately equimolar proportions at a rate of about 13-gram mols per hour and a reaction product was continuously discharged from the apparatus. The actual ratio between the two streams was adjusted to obtain a product of pH 8. During the reaction cooling water was supplied to the jacket of the apparatus so that the temperature of the product was 145° F. Two samples of the product had the following analysis:

| Percent Active | Percent Soap Calc. as Fatty Acid (FFA) | Percent FFA (active basis) |
|---|---|---|
| 21.33 | 0.74 | 3.5 |
| 18.96 | 0.70 | 3.7 |

*Example 2*

The procedure of Example 1 was followed with the exception that the sodium chloride was omitted from the solution comprising the second stream. The streams were fed in approximately equimolar proportions at a rate of about 26-gram mols per hour. The ratio between the two streams was adjusted to obtain a product which turned alk-acid paper a light green and the cooling water supplied to the apparatus was adjusted to obtain products at three different temperatures. The composition of the products prepared at the three different temperature levels were as follows:

| Product Temp. (° F.) | Percent Active | Percent FFA | Percent FFA (active basis) |
|---|---|---|---|
| 125 | 24.46 | 1.42 | 5.80 |
| 155 | 22.24 | 1.10 | 4.94 |
| 180 | 24.77 | 1.00 | 4.04 |

The improved results at higher temperatures are clearly evident. The slightly higher amounts of free fatty acids, compared with Example 1, arise from the higher rate of flow employed in this example.

*Example 3*

Two reactant streams, one consisting of the mixed acyl chloride employed in Example 1, and one comprising a solution of the following composition:

|  | Lbs. |
|---|---|
| Sodium methyl tauride (35% soln.) | 167.5 |
| Sodium hydroxide (47%) | 26.5 |
| Water | 206.0 |
| Total | 400.0 | were metered into a Model J-250 voltator in approximately equimolar proportions at a product rate of 621 pounds per hour with continuous withdrawal of product. The ratio between the two streams was adjusted to give products at three different pH levels. No cooling water was used. The composition of the products at the several pH levels was as follows:

| pH | Product Temp. (° F.) | Percent Active | Percent FFA | Percent FFA (active basis) |
|---|---|---|---|---|
| 8.8–8.9 | 150 | 21.57 | 0.6 | 2.78 |
| 8.0–8.1 | 155 | 23.49 | 0.7 | 2.98 |
| 7.0–7.2 | 160 | 25.13 | 0.9 | 3.58 |

Entirely similar results were achieved when the mixed palmitic-oleic acid chloride used in this example was replaced by acyl chlorides from mixed tallow acids, palmitic acid alone, and mixtures of palmitic and myristic acids.

*Example 4*

The procedure of Example 3 was repeated utilizing acyl chloride produced from a mixture of acids comprising about 76.5% palmitic acid, 18.4% oleic acid, and 5.1% stearic acid. Also, the amount of sodium hydroxide in the sodium methyl tauride stream was increased to give a higher molar ratio of sodium hydroxide to sodium methyl tauride.

Several runs were made with variations in product temperature, product pH, and the molar ratio of sodium hydroxide to sodium methyl tauride. The results are as follows:

| Run No. | Temp. (° F.) | Molar Ratio | pH | Percent Conversion of Sodium Methyl Tauride | Percent FFA (active basis) |
|---|---|---|---|---|---|
| 1 | 107–110 | 1:1 | 7.1 | 83.7 | 3.45 |
| 2 | 160 | 1:1 | 7.1 | 88.4 | 4.04 |
| 3 | 110 | 1:1 | 8.2 | 88.9 | 3.50 |
| 4 | 145 | 1:1 | 8.0 | 87.4 | 3.22 |
| 5 | 107–110 | 1:1 | 9.0 | 78.5 | 3.01 |
| 6 | 150 | 1:1 | 8.8 | 83.0 | 3.65 |
| 7 | 112 | 1.1:1 | 7.0 | 90.0 | 2.88 |
| 8 | 150 | 1.1:1 | 7.0 | 91.0 | 2.37 |
| 9 | 110 | 1.1:1 | 8.0 | 89.0 | 2.85 |
| 10 | 155 | 1.1:1 | 8.0 | 88.9 | 2.05 |
| 11 | 110 | 1.1:1 | 8.9 | 86.0 | 2.28 |
| 12 | 155 | 1.1:1 | 9.0 | 84.7 | 1.94 |

*Example 5*

The procedure of Example 4 was followed making several runs with variations in the molar ratio of sodium hydroxide to sodium methyl tauride. The results are as follows:

| Run No. | Temp. (° F.) | Molar Ratio | pH | Percent Conversion of Sodium Methyl Tauride | Percent FFA (active basis) |
|---|---|---|---|---|---|
| 1 | 160 | 1.1:1 | 7.6 | 84.4 | 2.55 |
| 2 | 166 | 1.2:1 | 7.7 | 89.3 | 2.16 |
| 3 | 165 | 1.3:1 | 8.0 | 89.8 | 2.66 |

From the preceding examples it can readily be seen that the process of the invention consistently leads to the formation of the desired product in high yield and contains only relatively small amounts of free fatty matter. It can further be seen that a molar ratio of sodium hydroxide to sodium methyl tauride of at least 1.1:1 is beneficial in reducing the amount of fatty impurities in the product.

It is intended to cover all changes and modifications in the preceding disclosure which do not constitute departure from the spirit and scope of the appended claims.

We claim:

1. A process for the preparation of an alkali metal acyl tauride of the formula

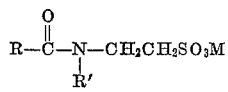

wherein R is an aliphatic hydrocarbon radical of 10 to 24 carbon atoms, R' is selected from the group consisting of hydrogen and alkyl radicals of 1 to 4 carbon atoms and M is an alkali metal, which comprises continuously intermingling with violent agitation a first reactant stream comprising an acyl chloride of the formula

wherein R is as defined above, and a second reactant stream comprising an aqueous solution of an alkali metal hydroxide and an alkali metal tauride of the formula

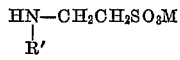

wherein R' and M are as defined above, and continuously withdrawing a reaction product, said second reactant stream having a molar ratio of alkali metal hydroxide to alkali metal tauride in the range of 1.1:1 to 1.4:1.

2. The process of claim 1 in which the temperature of the product is from 140 to 190° F.

3. A process for the preparation of a sodium acyl methyl tauride of the formula

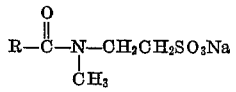

wherein R is an aliphatic hydrocarbon radical of 10 to 24 carbon atoms, which comprises continuously intermingling with violent agitation a first reactant stream comprising an acyl chloride of the formula

wherein R is as defined above, and a second reactant stream comprising an aqueous solution of sodium hydroxide and sodium methyl tauride, and continuously withdrawing a reaction product, said second reactant stream having a molar ratio of sodium hydroxide to sodium methyl tauride in the range of from 1.1:1 to 1.4:1.

4. The process of claim 3 in which the temperature of the product is from 140 to 190° F.

References Cited in the file of this patent

UNITED STATES PATENTS

| | | |
|---|---|---|
| 1,932,180 | Guenther et al. | Oct. 24, 1933 |
| 2,693,479 | Ross | Nov. 2, 1954 |

OTHER REFERENCES

McCutcheon: Synthetic Detergents, 1950, page 207.

Kastens & Ayo: Industrial & Engineering Chemistry, vol. 42 (1950), pp. 1626–1638.

Hoyt: German Chemical Developments in Synthetic Detergents and Wetting Agents, 1951, pp. 21–25, 30.